US008322364B2

(12) United States Patent
Lacasse et al.

(10) Patent No.: US 8,322,364 B2
(45) Date of Patent: Dec. 4, 2012

(54) ACTUATOR FOR OPERATING VALVES SUCH AS DIAPHRAGM VALVES

(75) Inventors: Louis Lacasse, Mascouche (CA); David Balasubramanian, Town of Mount Royal (CA)

(73) Assignee: MBF Stainless Valve Limited, Terrebonne (CA)

( * ) Notice: Subject to any disclaimer, the term of this patent is extended or adjusted under 35 U.S.C. 154(b) by 441 days.

(21) Appl. No.: 12/564,451

(22) Filed: Sep. 22, 2009

(65) Prior Publication Data

US 2010/0072410 A1  Mar. 25, 2010

Related U.S. Application Data

(60) Provisional application No. 61/098,976, filed on Sep. 22, 2008.

(51) Int. Cl.
*F16K 27/04* (2006.01)
(52) U.S. Cl. ......... 137/270; 137/271; 251/61; 251/61.2; 251/291
(58) Field of Classification Search ........... 251/61–63.6, 251/290, 291; 137/270, 271
See application file for complete search history.

(56) References Cited

U.S. PATENT DOCUMENTS

| | | | | |
|---|---|---|---|---|
| 3,026,896 A | * | 3/1962 | Bosworth et al. | ............. 137/270 |
| 3,827,670 A | * | 8/1974 | Saarem | ............................ 251/81 |
| 3,958,592 A | * | 5/1976 | Wells et al. | ................ 137/315.3 |
| 4,397,329 A | | 8/1983 | Marshall | |
| 4,582,082 A | * | 4/1986 | Tosseghini | .................... 137/270 |
| 4,596,267 A | * | 6/1986 | Tosseghini | .................... 137/270 |
| 4,712,576 A | * | 12/1987 | Ariizumi et al. | .............. 137/270 |
| 4,712,577 A | * | 12/1987 | Angelillo | ....................... 137/270 |
| 4,840,347 A | * | 6/1989 | Ariizumi et al. | ............. 251/63.4 |
| 4,885,981 A | * | 12/1989 | Roettger et al. | ................... 92/59 |
| 5,487,527 A | * | 1/1996 | Eggleston | ....................... 251/62 |
| 5,762,315 A | * | 6/1998 | Eggleston | .................... 251/61.4 |
| 5,853,022 A | * | 12/1998 | Eggleston et al. | ............ 137/270 |
| 6,192,912 B1 | * | 2/2001 | Butler et al. | ............... 137/15.19 |
| 6,612,538 B2 | | 9/2003 | Fukano et al. | |
| 7,278,441 B2 | * | 10/2007 | Tanikawa et al. | ............. 137/270 |
| 7,509,972 B2 | | 3/2009 | Nesbitt | |

FOREIGN PATENT DOCUMENTS

FR  2915786  11/2008

OTHER PUBLICATIONS

International Search Report of Corresponding PCT Application No. PCT/CA2009/001345.

* cited by examiner

*Primary Examiner* — Craig Schneider
*Assistant Examiner* — Matthew W Jellett
(74) *Attorney, Agent, or Firm* — Bereskin & Parr LLP

(57) ABSTRACT

An actuator for operating a valve comprises a housing, a cap, a ring and a piston. The housing has a connecting interface for being mounted on the valve. The cap substantially covers a first portion of the housing. Both the cap and the housing define a substantially enclosed space inside the housing. The ring sealably covers a second portion of the housing. The ring is equipped with two ports that are in fluid communication with the enclosed space. The piston is slidably located inside the housing. Advantageously, an actuator assembly may include the actuator as previously described and one bonnet, one of the connecting interfaces of the actuator being connected to the bonnet. The bonnet is adapted to be mounted to a valve body.

17 Claims, 7 Drawing Sheets

DOUBLE ACTING

SPRING TO CLOSE

SPRING TO OPEN

ACTUATOR FOR OPERATING VALVES SUCH AS DIAPHRAGM VALVES

FIELD OF THE INVENTION

The present invention generally relates to the field of fluid regulating devices. More particularly, the present invention relates to linear actuators for valves such as diaphragm valves.

BACKGROUND OF THE INVENTION

A conventional actuator 10 for a diaphragm valve is depicted in FIG. 1. In a typical fashion, a piston 14 connected to a stem 16 moves up and down within an actuator housing 18. The stem 16 is, directly or through the use of an adaptor 19, in contact with a diaphragm 20, which closes or opens the valve 12 according to the piston position. The piston 14 is biased to a normal position by the force of a spring 22. When a pressurized fluid such as air is introduced on the side of the piston opposed to the spring 22, the piston 14 moves under the air pressure, which pulls on the diaphragm 20, either opening the valve 12 as in the case of the valve shown in FIG. 1, or closing the valve. When the air pressure is released, the spring 22 returns the piston 14 back to its normal position, which in turn pushes on the diaphragm 20 and reverses the opening, or closing, of the valve 12. The air is routed through air inlet and exhaust ports 24 that are an integral part of the actuator 10.

The diaphragm 20 of this type of valve is positioned between the valve body 26 and a bonnet 28, which is a flange used to secure the actuator 10 to the valve body 26. As shown, the bonnet 28 is an integral part of the actuator 10.

Because of the commercial importance of being able to retrofit actuators to older valves, the design of the valve flange has not evolved over the years. Consequently, mostly because of a bolt pattern of the standard valve flange, it is possible to install the actuator in only two positions, at 180 degrees from each other. In many applications, the typical housing construction, with its integral air inlet and exhaust ports, dictates the orientation of the actuator, due to the restrictions in routing the associated piping to the ports. However, since only two different orientations are possible, often neither orientation is ideal, given the space constraints in the installations. To alleviate this problem, additional piping components such as swivel connectors have been mounted to the air inlet ports. However, these take up more space than may be convenient in some installations, and they are also somewhat limited in their orientation.

Another problem with known diaphragm valve actuators is that they have to be made specifically for each type of valve, depending on the size of the flange, the bolt pattern, the length of stroke required to activate the valve, and whether the valve should be normally closed or open (or modulating). Consequently, a multitude of different models of actuators needs to be manufactured and held in inventory.

There is therefore a clear need for an improved actuator suitable to operate diaphragm valves and other valves that have a linear actuator.

SUMMARY OF THE INVENTION

It is an object of the present invention to provide a valve actuator that overcomes or mitigates one or more disadvantages of known valve actuators, or at least provides a useful alternative.

The invention provides the advantages of being adaptable to many types of valves, being not limited to only two orientations of air inlet and exhaust ports, being adaptable to either a normally closed or a normally open position, and optionally having an adjustable stroke.

Moreover, because of its novel construction, it is possible to remove the valve actuator of the present invention without compromising the sterilization of the flow running inside the line on which the valve actuator is installed. This advantageously eliminates additional cleaning and validating issues as well as associated downtime and cost.

In accordance with one embodiment of the present invention, there is provided an actuator for operating a valve through a stem. The actuator comprises a housing, a cap, a ring and a piston. The housing has a connecting interface for being mounted on the valve. The cap substantially covers a first portion of the housing. Both the cap and the housing define a substantially enclosed space inside the housing. The ring sealably covers a second portion of the housing. The ring is equipped with two ports. Each port is in fluid communication with the enclosed space on a different side of the piston. The piston is slidably located inside the housing and operative to contact the stem.

Optionally, the cap also comprises a connecting interface so that it may be mounted on the valve. Both connecting interfaces have a substantially similar configuration. For example, both have substantially the same shape and may have mating threads. They also may comprise a locking mechanism, such as a set screw for example, for locking the actuator in place on the valve.

Optionally, the ring is rotatable on the housing for adequately orienting inlet and exhaust ports. The ring and the housing thus define two separate passageways. One of these passageways is in fluid communication with one of the two ports while the other passageway is in fluid communication with the other port. Advantageously, the passageways are circumferential.

Optionally, the actuator may be equipped with a stem connected to the piston for those valves not so equipped. The stem is operatively located to protrude within the connecting interface of either the housing or the cap to operate the valve.

A spring may be used in the actuator to bias the piston in one direction.

Advantageously, an actuator assembly may include the actuator as previously described and one bonnet, one of the connecting interfaces of the actuator being connected to the bonnet, which is adapted to be mounted to a valve body.

In accordance with another embodiment of the present invention, there is provided an actuator assembly for operating a valve through a stem. The actuator comprises a housing, a cap, a piston, a valve and a sight window. The housing has a first connecting interface. The cap, used to substantially cover a first portion of the housing, defines, in combination with the housing, a substantially enclosed space inside the housing. The cap has a second connecting interface with a substantially similar configuration as the first connecting interface. The piston is slidably located inside the housing and is operative to contact the stem. The valve bonnet, which is adapted to be mounted to the body of the valve, is mountable to either one of the connecting interfaces. The sight window is mounted to the other connecting interface.

The present invention therefore relates to an improved actuator for valves, especially for diaphragm valves. In prior art actuators of this type, it was typical that a bonnet, the bonnet being used to cover a valve body, was cast or molded as an integral part of the actuator. This caused several drawbacks. In the present invention, not only has the bonnet been separated from the actuator, but many more improvements have been brought to the actuator, which improve the actuator versatility. For example, inlet and exhaust ports are no longer restricted to only two orientations. Another improvement is that substantially the same actuator may easily be operated in either a normally open, normally closed or in a double acting configuration.

Although the actuator in accordance with the present invention may be adapted to be used on a multitude of different types of valves, the description will refer to a specific example of the use of the actuator on a diaphragm valve requiring a bonnet. It will however be understood that the actuator of the present invention may be used directly on a valve that would be designed to accept this actuator, for example a valve that would incorporate the equivalent of the bonnet.

BRIEF DESCRIPTION OF DRAWINGS

These and other features of the present invention will become more apparent from the following description in which reference is made to the appended drawings wherein.

DETAILED DESCRIPTION OF THE INVENTION

Figure 2:
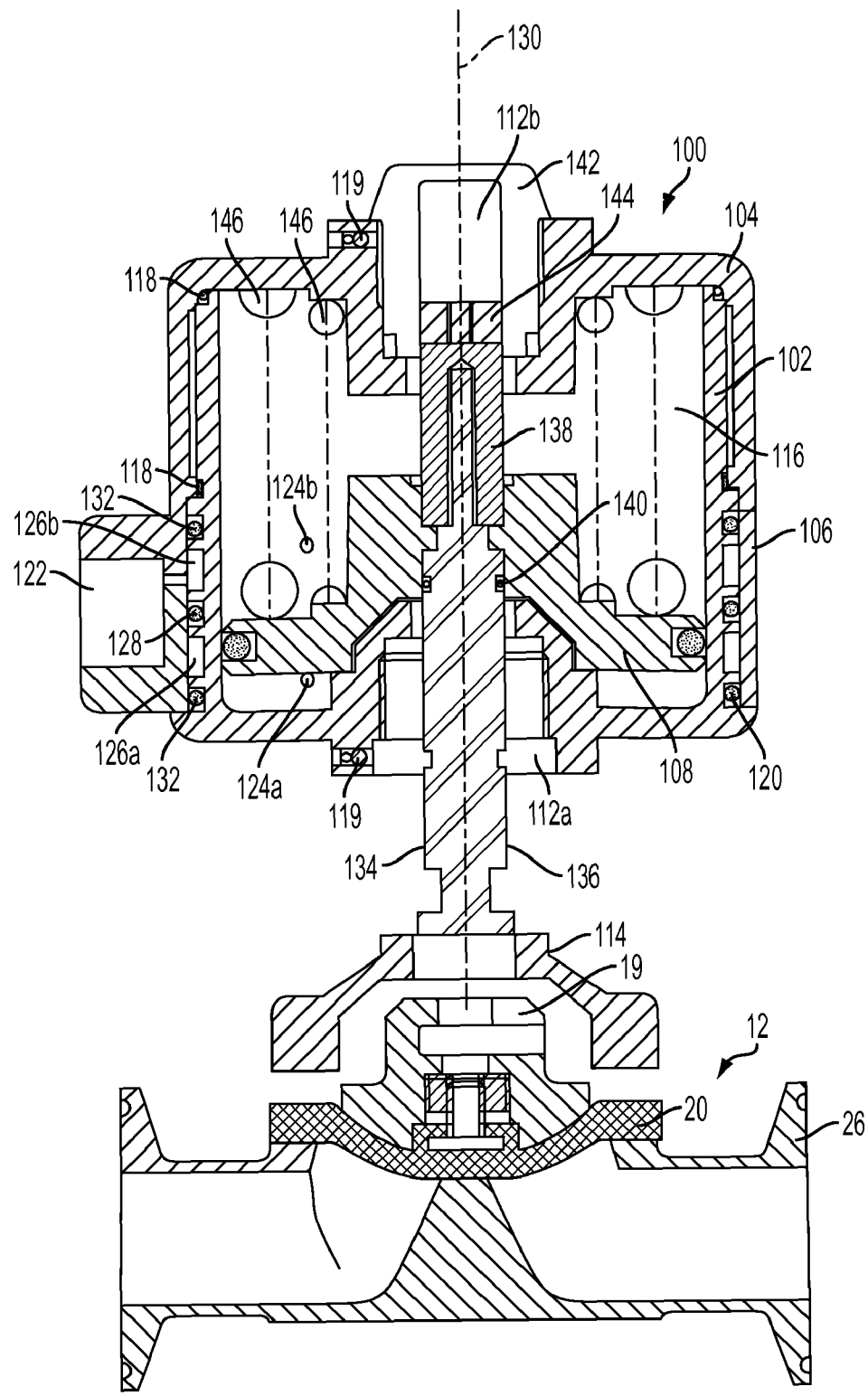
FIG. 2 is a cross-sectional front view of an actuator in accordance with an embodiment of the present invention, the actuator being shown over a bonnet and the diaphragm valve of FIG. 1.
Figure 3:
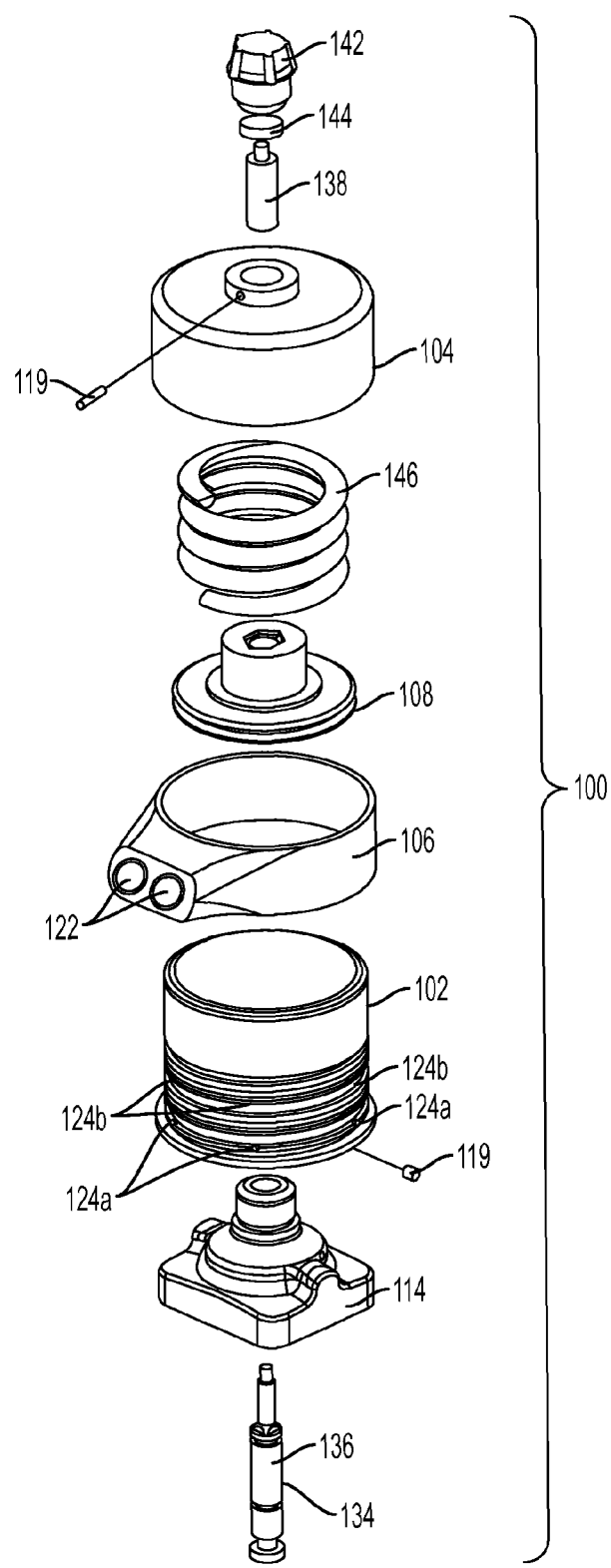
FIG. 3 is an exploded isometric view of an actuator assembly comprising the actuator and the bonnet of FIG. 2 in accordance with another embodiment of the present invention.

Referring first to FIGS. 2 and 3, an actuator 100 that is designed to operate a diaphragm valve 12 is shown. The actuator is made of a housing 102, a cap 104, a swivel ring 106 and a piston 108. The housing 102 has a cylindrical shape, open at one end and substantially closed at the other end. The substantially closed end is equipped with a connecting interface 112a that is designed to connect the actuator 100 to the valve 12, either directly or, as is the case in the present example, through the use of a bonnet 114. The housing may be made of different materials such as metals or plastics.

The cap 104 substantially covers the open end of the housing 102. It may also cover a first portion of the exterior of the housing 102. The cap 104 and the housing 102 define a substantially enclosed space 116 inside the housing 102. The cap 104 is sealed against the housing 102 with the use of cap O-rings 118 to prevent air from leaking out of the actuator 100.

Optionally, the cap 104 also comprises its own connecting interface 112b, similar to the connecting interface on the housing 102. As both connecting interfaces 112a, 122b have a substantially similar configuration, it is possible to use one or the other to mount the actuator 100 to the bonnet 114. Note that the connecting interfaces 112a, 112b need not be necessarily of a female type as shown. They could also be of a male type. It will be apparent to the person skilled in the art that an important requirement being that the connecting interfaces 112a, 112b be compatible with the bonnet 114. For example, both connecting interfaces 112a, 112b may be threaded to fit on a type of bonnet 114 equipped with mating threads. Furthermore, both connecting interfaces 112a, 112b may be equipped with a locking mechanism, such as setscrews 119, to lock the actuator 100 in place on the bonnet 114. Providing both the bonnet 114 and the connecting interfaces 112a, 112b with threads facilitates adjustment of the height of the actuator 100 with respect to the bonnet 114, which in turn influences the active stroke by which the diaphragm 20 will be displaced. Hence, when the bonnet 114 is inserted farther in either one of the connecting interfaces 112a, 112b, the active stroke will be longer. Conversely, when the bonnet 114 is inserted less in either one of the connecting interfaces 112a, 112b, the active stroke will be shorter. The locking mechanism, or setscrews 119, may be used to lock in place the actuator 100 on the bonnet 114 so that the active stroke does not vary with time. The person skilled in the art will appreciate that other types of locking mechanisms may also be used, such as a wave spring for example. The advantage of having similar connecting interfaces 112a, 112b on both the housing 102 and the cap 104 will be discussed below.

Moreover, because the actuator 100 may be installed at any angular orientation on the bonnet 114 (for example, by screwing the actuator 100 more or less fully on the bonnet 114), the ports may be conveniently oriented for a given installation.

The ring 106 covers a second portion of the housing 102. Conveniently, the ring 106 may be positioned between a shoulder 120 provided in the housing 102 and the cap 104. The ring 106 is equipped with two ports 122, each acting either as an inlet port or an exhaust port, depending on the situation and the actuator configuration, as will be discussed in more detail below. Both ports 122 are in fluid communication with the enclosed space 116 through orifices 124a, 124b in a wall of the housing 102 and through two separate passageways 126a and 126b. Each orifice 124a, 124b is located on a different side of the piston 108. The two passageways 126a, 126b may be circumferential. The passageways 126a, 126b are defined between the housing 102 and the ring 106.

In FIG. 2, the passageways 126a, 126b are shown as grooves in the housing 102, closed by the ring 106. However the grooves could also be located in the ring 106 and closed by the housing 102. Each of the passageways 126a, 126b is fluidly isolated from each other by a passageway O-ring 128. Each port 122 is connected to a different one of the two passageways 126a, 126b. One of the ports 122, such as port 122 shown in FIG. 2, communicates with passageway 126b and orifice 124b while the other port 122, not shown, similarly communicates with passageway 126a and orifice 124a. Depending through which port 122 a pressurized fluid, such as air, enters the enclosed space 116, the piston 108 slides up or down against an inner wall of the housing 102, sealably dividing the enclosed space 116 in two. Meanwhile, trapped fluid (such as air) on the other side of the piston 108 exits the enclosed space 116 through the other port 122, which then acts as the exhaust port.

The ring 106 is rotatable on the housing 102. This is advantageous as it is thus possible to swivel the ports 122 by 360° around a central axis 130. Therefore, even if the actuator 100 is locked in place on the bonnet 114, it is still possible to align the ports 122 so that the piping connected to the ports 122 can be conveniently routed where there is ample room available. The circumferential passageways 126a, 126b make it possible to rotate the ring 106 on the housing 102 while constantly fluidly connecting the ports 122 with the orifices 124a, 124b, notwithstanding the position of the ports 122 around the housing 102. Having the possibility to independently rotate the ports 122 from the housing 102 is convenient since a rotation of the housing 102, when the connecting interfaces 112a, 112b are provided with threads would necessarily lead to a variation of the active stroke. Port O-rings 132 ensure that fluid does not leak between the ring 106 and the housing 102.

Some types of valves are provided with a stem while others are not. Since diaphragm valves are typically not provided with a stem, it is possible to equip the actuator 100 with the stem 134. The stem 134 may be manufactured of two parts, a screw portion 136 and a nut portion 138. This design facilitates insertion of the screw portion 136 in the piston 108 from either side and locking it in place with the nut portion 138. A stem O-ring 140 ensures that there is no leakage between the stem 134 and the piston 108. The stem 134 protrudes within the connecting interface 112a of the housing 102 and is made to contact and operate, directly or through the use of the adaptor 19, the diaphragm 20 of the valve 12. (The stem 134 could also protrude within the connecting interface 112b of the cap 104, as will be described further below.)

A sight window 142 may be mounted either in the cap connecting interface 112b (as shown) or in the housing connecting interface 112a. The sight window 142 is mounted in the connecting interface 112b opposite to an extremity of the stem 134 that is intended to operate the valve 12. In FIG. 2, the extremity of the stem 134 that is intended to operate the valve 12 protrudes from the housing 102. Hence, the sight window 142 is installed in the cap connecting interface 112b. Through the sight window 142, it is possible to view another extremity of the stem 134. To be more conspicuous, this extremity of the stem 134 may be equipped with a witness cap 144 that follows the movement of the stem 134.

The actuator 100 may also be provided with a biasing means such as springs 146 to bias the piston 108 against a bottom of the housing 102. Depending on the force required, one or more springs 146 may be used. The use of such springs 146 biases the piston 108, the stem 134, and thereby the diaphragm 20 of the valve 12, in a given position when there is no fluid pressure applied in the actuator. For example, in FIG. 2, the actuator 100 is shown in a normally closed, or "spring to close" configuration. A normally open, or "spring to open" configuration is also possible, as will be discussed in more detail later.

Figure 4A:
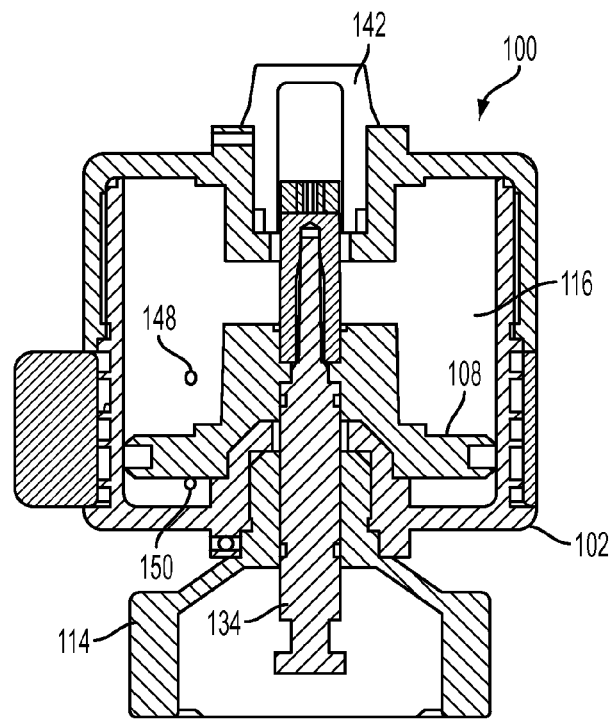
FIG. 4a is a cross-sectional front view of the actuator assembly of FIG. 3 where the actuator is assembled in a double acting configuration in accordance with another embodiment of the present invention.
Figure 4B:
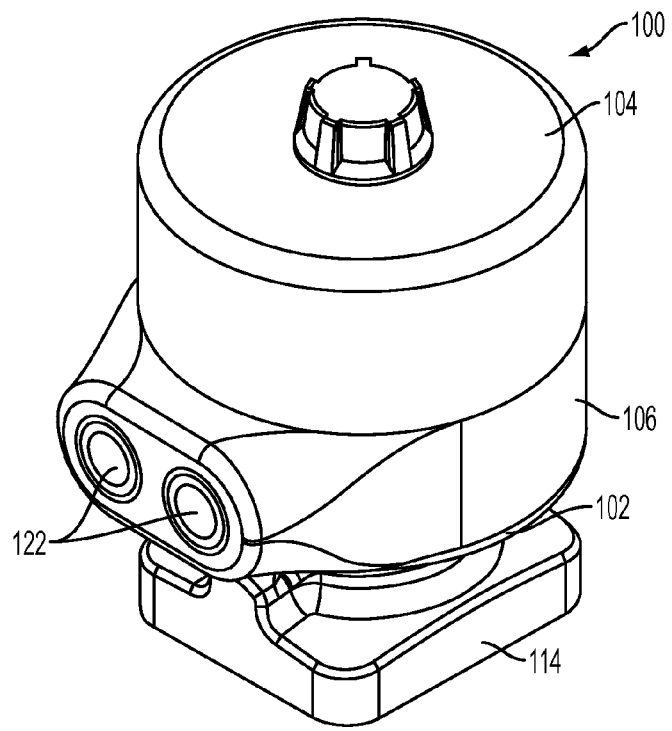
FIG. 4b is an isometric view of the actuator assembly of FIG. 4a showing the specific location of the air inlet and exhaust ports for the double acting configuration.

The advantage of having similar connecting interfaces 112a, 112b on both the housing 102 and the cap 104 will become clear by referring to FIGS. 4a to 6b. FIG. 4a depicts the actuator 100 in a double acting configuration. In this configuration, the piston 108 is free to move depending on which of its sides receives the higher fluid pressure. For example, if the piston 108 is to make the stem 134 extend from the actuator 100, pressurized fluid will be made to enter the enclosed space 116 through a first hole 148, creating a higher pressure zone on the side of the piston 108 opposed to the bonnet 114, thereby driving the piston towards the bonnet 114. Similarly, if the stem 134 is to be made to retract within the actuator 100, the pressurized fluid is made to enter the enclosed space 116 through a second hole 150, creating a higher pressure zone on the bonnet side of the piston 108, thereby driving the piston away from the bonnet 114. FIG. 4b shows the position of the ring 106 and the inlet and exhaust ports 122 for the double acting configuration. In this configuration, the actuator 100 may be connected to the bonnet 114 through any one of the connecting interfaces 112a, 112b, assuming that the stem 134 and the sight window 142 are installed accordingly.

Figure 5A:
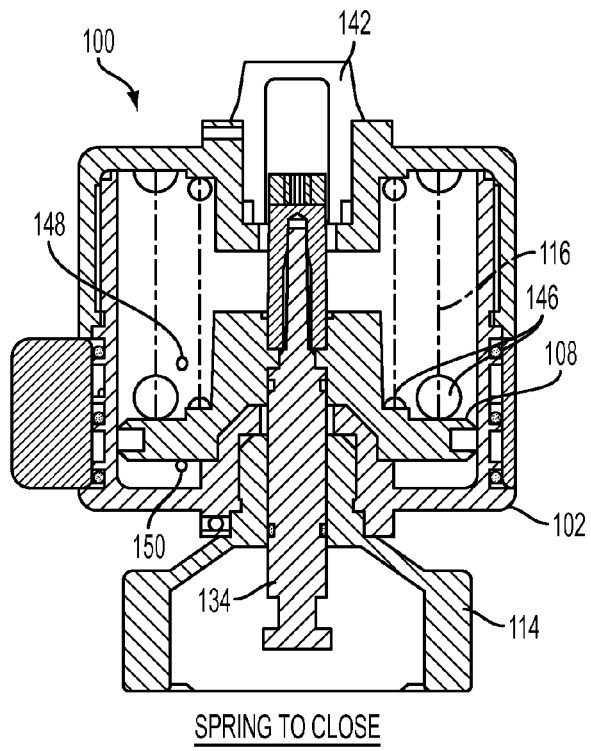
FIG. 5a is a cross-sectional front view of the actuator assembly of FIG. 3 where the actuator is assembled in a normally closed configuration.
Figure 5B:
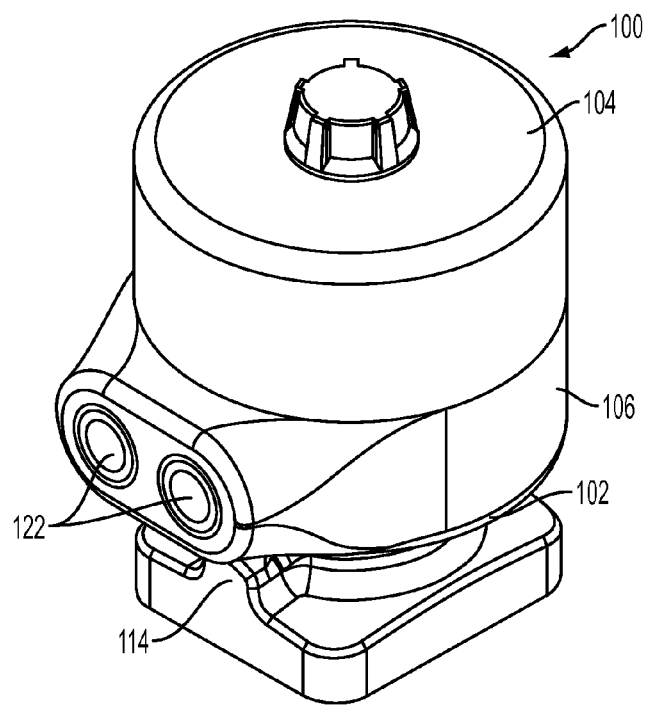
FIG. 5b is an isometric view of the actuator assembly of FIG. 5a showing the specific location of the air inlet and exhaust ports for the normally closed configuration.

FIG. 5a depicts the actuator 100 in the normally closed, or "spring to close" configuration. In this configuration, the piston 108 is biased toward the bottom of the housing 102 through the use of the springs 146, in the absence of a difference in the fluid pressure on each side of the piston 108. For example, if the piston 108 is to make the stem 134 extend from the actuator 100, no fluid pressure is required as the spring 146 already biases the piston 106 in that position. However, if the stem 134 is made to be retracted within the actuator 100, a fluid pressure is required to enter the enclosed space 116 through the second hole 150, compressing the spring 146. As soon as the fluid pressure drops such that it does not provide a force on the piston 108 greater than the force developed by the spring 146, the piston 106 moves back against the bottom of the housing 102, biased by the spring 146. FIG. 5b shows the position of the housing 102, the cap 104, the ring 106 and the inlet and exhaust ports 122 for the normally closed (spring to close) configuration. In this configuration, the connecting interface 112a of the housing 102 is connected to the bonnet 114.

Figure 6A:
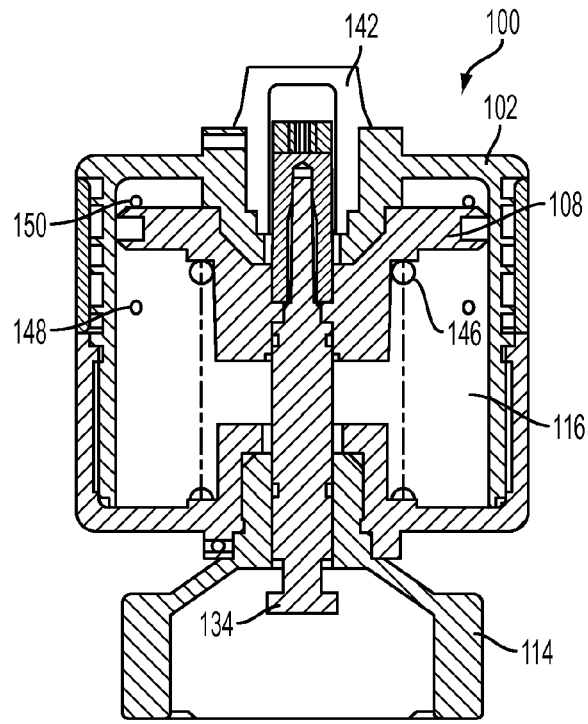
FIG. 6a is a cross-sectional front view of the actuator assembly of FIG. 3 where the actuator is assembled in a normally open configuration.
Figure 6B:
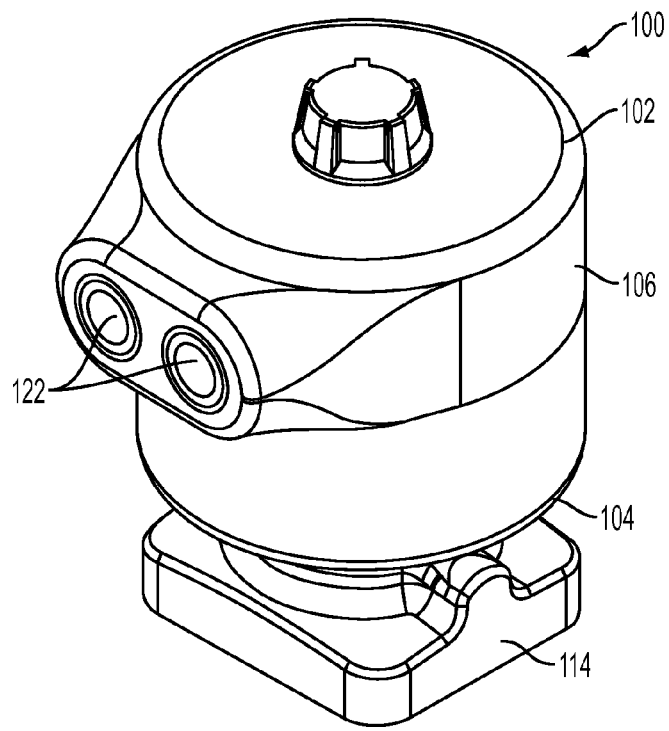
FIG. 6b is an isometric view of the actuator assembly of FIG. 6a showing the specific location of the air inlet and exhaust ports for the normally open configuration.

FIG. 6a depicts the actuator 100 in the normally open, or "spring to open", configuration. In this configuration, the piston 108 is also biased toward the bottom of the housing 102 through the use of the springs 146, in the absence of a difference in the fluid pressure on each side of the piston 108. However, in this case, the actuator 100 has been placed inverted on the bonnet 114 so that the connecting interface 112b of the cap 104 is now connected to the bonnet 114. Advantageously, because the connecting interfaces 112a. 112b of both the housing 102 and the cap 104 have substantially the same design, the actuator 100 may be mounted on the bonnet 114, or on a valve that would have a similar interface as the bonnet 114. For example, if the piston 108 is to make the stem 134 extend from the actuator 100, the fluid pressure is required to enter the enclosed space 116 through second hole 150 so that the force developed by the spring 146 may be overcome and the spring 146 compressed. However, if the stem 134 is made to be retracted within the actuator 100, no fluid pressure is required since the spring 146 biases the piston 106 in that position. As soon as the fluid pressure drops such that it does not provide a force on the piston 108 greater than the force developed by the spring 146, the piston 106 moves back against the bottom of the housing 102 (now in an upper portion of the actuator 100), biased by the spring 146. FIG. 6b shows the position of the housing 102, the cap 104, the ring 106 and the inlet and exhaust ports 122 for the normally open, or spring to open configuration. By comparing FIGS. 5a with 6a and 5b with 6b, it may be observed that the only changes necessary for shifting the actuator from being in a normally open to being in a normally closed configuration are to change the orientation of the stem 134 with respect to the housing 102 and to change the sight window 142 accordingly. In the normally closed configuration, the connecting interface 112a in the housing 102 is connected to the bonnet 114 while in the normally open configuration, the connecting interface 112b in the cap 104 is connected to the bonnet 114. Changes to springs 146 may or may not be required, depending on a particular application of the actuator 100.

Figure 1:
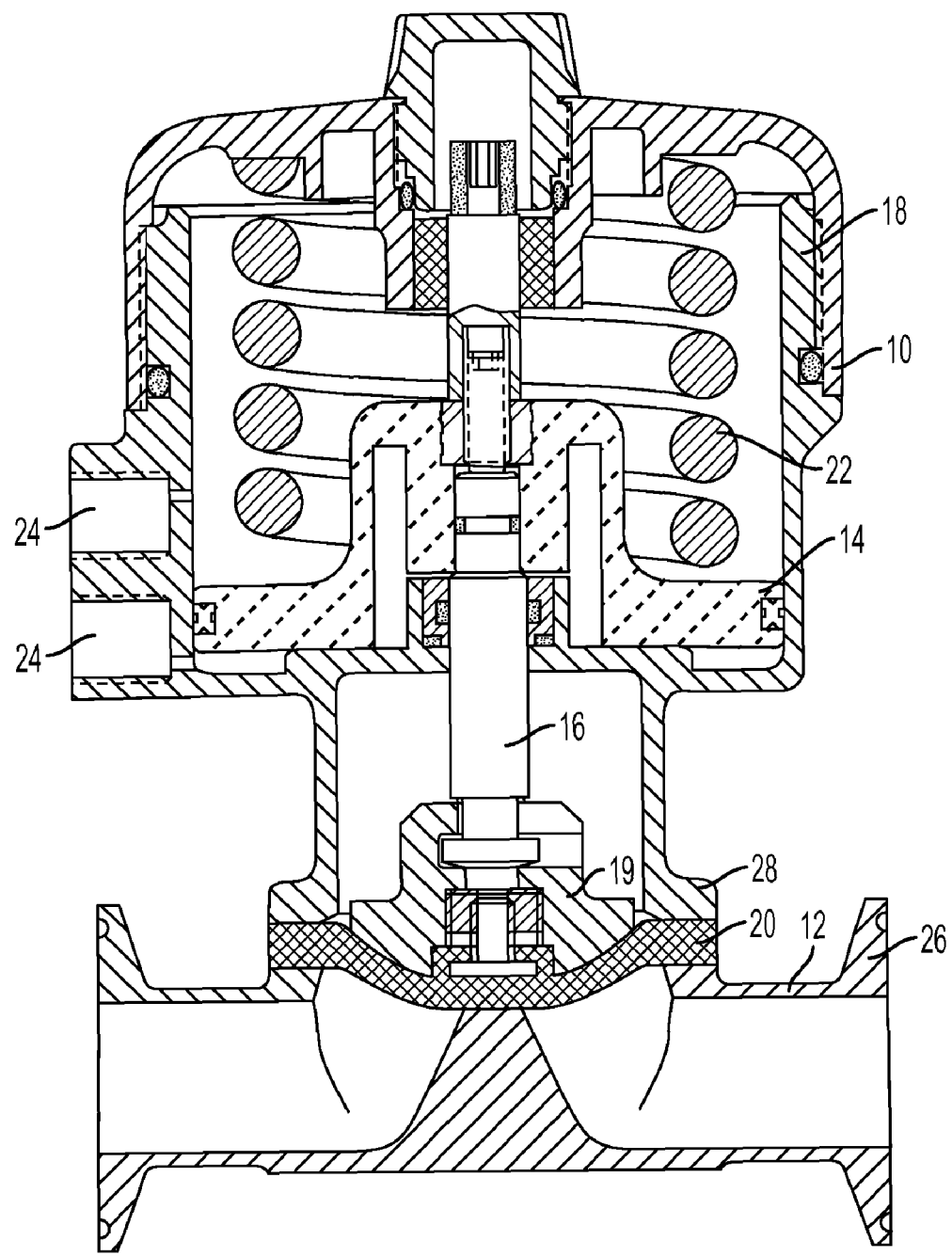
FIG. 1 is a cross-sectional front view of a prior art actuator mounted on a diaphragm valve.
Figure 7:
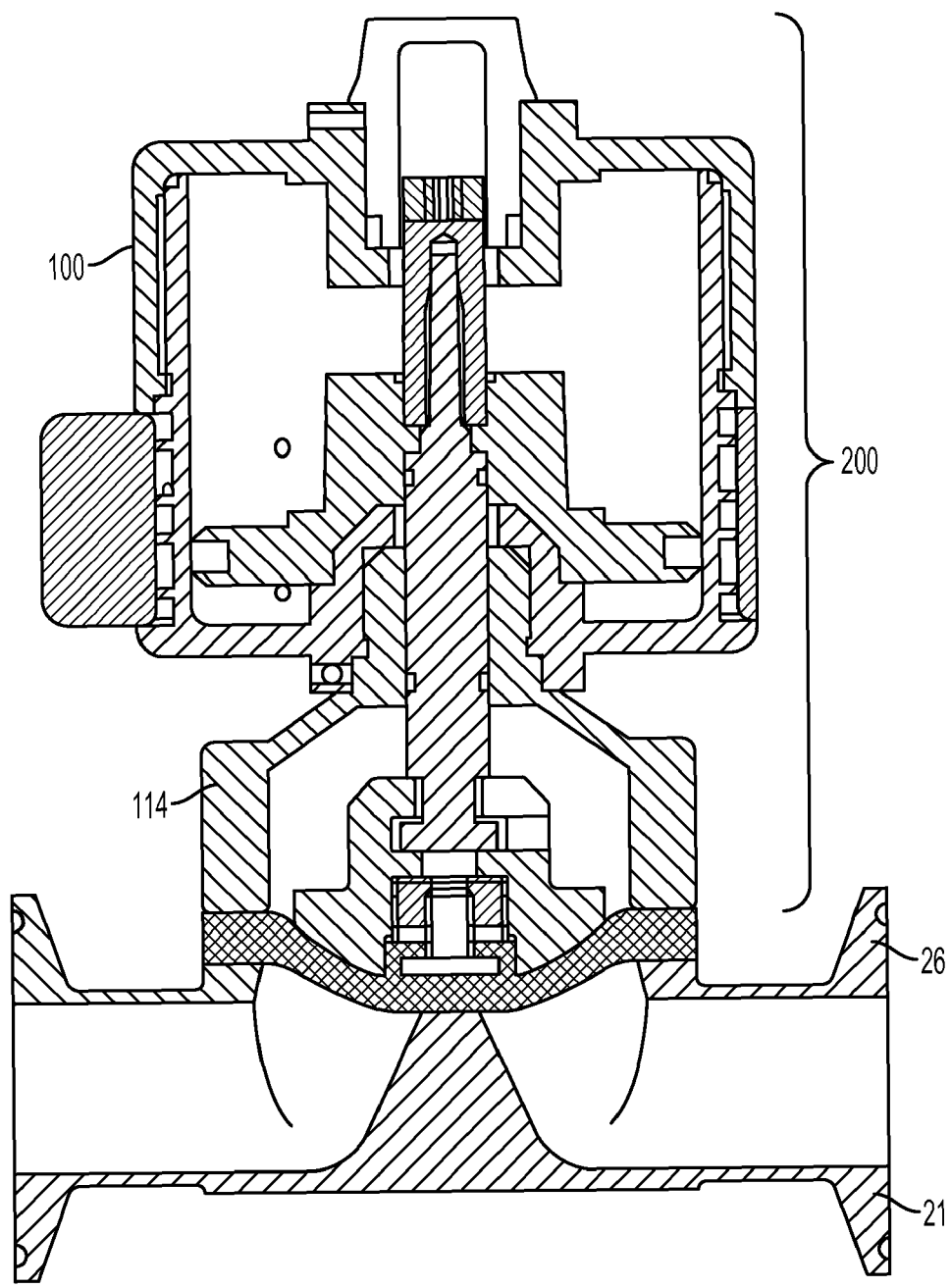
FIG. 7 is a cross-sectional front view of the actuator assembly of FIG. 3 shown installed on a diaphragm valve.

Since in some particular industries the bonnet 114 is integrally cast or molded with the actuator (such as displayed in the FIG. 1 showing the prior art), it may be advantageous to supply an actuator assembly 200 comprising both the actuator 100 and the bonnet 114, as shown in the embodiment of FIG. 7. In the actuator assembly 200, the actuator 100 may be supplied in any of the aforementioned configurations and equipped with any of the optional variants previously described. FIG. 7 also shows the valve body 26 to which the bonnet 114 may be connected.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

The invention claimed is:

1. An actuator assembly for operating a valve through a stem, the actuator comprising:
   a housing having a connecting interface for being mounted on the valve;
   a cap for substantially covering a first portion of said housing, said cap and said housing defining a substantially enclosed space inside said housing;
   a piston slidably located inside said housing and operative to contact the stem;
   a ring sealably covering a second portion of said housing, said ring being equipped with two ports, each of said two ports being in fluid communication with said enclosed space on a different side of said piston, and said ring being mountable on said housing such that said ports may be positioned in a variety of orientations; and
   a valve bonnet mountable to either one of said connecting interfaces, said bonnet being adapted to be mounted to a valve body of the valve.

2. The actuator assembly of claim 1 wherein said cap also comprises a connecting interface for being mounted on the bonnet, both said connecting interfaces having a substantially similar configuration.

3. The actuator assembly of claim 2 wherein said actuator is rotatably mounted to said bonnet.

4. The actuator assembly of claim 3 wherein said connecting interfaces and said bonnet have matching threads.

5. The actuator assembly claim 4 wherein both connecting interfaces comprise a locking mechanism for locking said actuator in place on said bonnet.

6. The actuator assembly of claim 5 wherein said locking mechanism is a set screw.

7. The actuator assembly of claim 6 wherein said ring and said housing define two separate circumferential passageways, a first of said passageways being in fluid communication with a first of said two ports and a second of said passageways being in fluid communication with a second of said two ports.

8. The actuator assembly of claim 2 wherein the stem is connected to said piston, said stem being operatively located to protrude within said connecting interface of one of said housing and said cap to operate the valve.

9. The actuator assembly of claim 2 further comprising a spring to bias said piston in one direction.

10. The actuator assembly of claim 2 further comprising a sight window mounted to the other of said connecting interfaces.

11. The actuator assembly of claim 2, wherein said valve bonnet is extendably mounted to said either one of said connecting surfaces so as to accommodate a change in the length of stroke of said piston.

12. The actuator assembly of claim 11, wherein said connecting interfaces and said valve bonnet have matching threads.

13. The actuator assembly of claim 7, wherein the housing defines one or more first orifices within the section of the housing defining the first of said circumferential passageways and defines one or more second orifices within the section of the housing defining the second of said passageways, the first of said two ports being in fluid communication with said enclosed space through the first of said circumferential passageways and through one or more of said first orifices and the second of said two ports being in fluid communication with said enclosed space through the second of said circumferential passageways and through one or more of said second orifices.

14. The actuator of claim 13, wherein the housing comprises:
   a first circumferential groove defining the one or more first orifices and the first of said circumferential passageways with the ring; and
   a second circumferential groove defining the one or more second orifices and the second of said circumferential passageways with the ring.

15. The actuator of claim 7, wherein the ring comprises a first circumferential groove defining the first of said passageways with the housing, and a second circumferential groove defining the second of said passageways with the housing.

16. An actuator assembly for operating a valve through a stem, the actuator comprising:
   a housing having a first connecting interface;
   a cap for substantially covering a first portion of said housing, said cap and said housing defining a substantially enclosed space inside said housing, and said cap having a second connecting interface with a substantially similar configuration as said first connecting interface;
   a piston slidably located inside said housing and operative to contact the stem;
   a valve bonnet extendably mounted to either one of said connecting interfaces, the length of stroke of said piston being adjustable when the valve bonnet is extendably mounted, said bonnet being adapted to be mounted to the body of the valve; and a sight window mounted to the other of said connecting interfaces;
   wherein the housing further defines one or more of first orifices arranged circumferentially and one or more second orifices arranged circumferentially, the first orifices providing a fluid communication between the enclosed space on a first side of the piston and an outside of the housing and the second orifices providing a fluid communication between the enclosed space on a second side of the piston and the outside of the housing; and
   wherein the housing further comprises a first circumferential groove defining a first circumferential passageway, and a second circumferential groove defining a second circumferential passageway.

17. An actuator for operating a valve through a stem, the actuator comprising:
   a housing having a connecting interface for being mounted on the valve;

a cap for substantially covering a first portion of said housing, said cap and said housing defining a substantially enclosed space inside said housing;

a piston slidably located inside said housing and operative to contact the stem;

a ring sealably covering a second portion of said housing, said ring being equipped with two ports, each of said two ports being in fluid communication with said enclosed space on a different side of said piston, and said ring being rotatable on said housing such that said ports may be positioned in a variety of orientations;

wherein the ring and the housing define two separate circumferential passageways, a first of said two ports being in fluid communication with said enclosed space through a first of said passageways and a second of said two ports being in fluid communication with said enclosed space through a second of said passageways;

wherein said cap also comprises a connecting interface for being mounted on the valve, both said connecting interfaces having a substantially similar configuration; and wherein either one of said connecting interfaces is mountable to a valve bonnet adapted to be mounted to a body of the valve.

* * * * *